(12) United States Patent
Baba

(10) Patent No.: US 7,111,709 B2
(45) Date of Patent: Sep. 26, 2006

(54) DISK BRAKE DEVICES

(75) Inventor: Haruhisa Baba, Kariya (JP)

(73) Assignee: Advics Co., Ltd., Kariya (JP)

( * ) Notice: Subject to any disclaimer, the term of this patent is extended or adjusted under 35 U.S.C. 154(b) by 0 days.

(21) Appl. No.: 10/845,266

(22) Filed: May 14, 2004

(65) Prior Publication Data

US 2004/0226787 A1    Nov. 18, 2004

(30) Foreign Application Priority Data

May 14, 2003    (JP)    ............................ 2003-136038

(51) Int. Cl.
 *F16D 65/38*    (2006.01)
(52) U.S. Cl. ................. 188/73.37; 188/259; 188/250 E
(58) Field of Classification Search ............ 188/73.35, 188/73.37, 259, 250 E, 73.36
See application file for complete search history.

(56) References Cited

U.S. PATENT DOCUMENTS

| | | | | |
|---|---|---|---|---|
| 3,001,622 A | * | 9/1961 | Goldberg | ..................... 188/259 |
| 3,751,330 A | * | 8/1973 | Gilbert | ........................ 188/259 |
| 4,666,025 A | * | 5/1987 | Rubin | ..................... 192/70.28 |
| 4,691,810 A | * | 9/1987 | Matsuzaki | ............... 188/250 E |
| 5,117,949 A | * | 6/1992 | Buckley et al. | ............. 188/259 |
| 5,363,943 A | * | 11/1994 | Iwashita et al. | ........... 188/72.5 |
| 5,464,075 A | * | 11/1995 | Everett | ....................... 188/259 |
| 5,564,533 A | * | 10/1996 | Parsons | ................. 188/250 E |
| 6,032,767 A | * | 3/2000 | Roehling | .................... 188/73.1 |
| 6,481,544 B1 | * | 11/2002 | Brecht et al. | ........... 188/250 E |
| 6,698,556 B1 | * | 3/2004 | Fontan | ....................... 188/259 |

FOREIGN PATENT DOCUMENTS

JP    6-69459    9/1994

* cited by examiner

*Primary Examiner*—Robert A. Siconolfi
(74) *Attorney, Agent, or Firm*—Buchanan Ingersoll & Rooney PC

(57) ABSTRACT

A disk brake device includes a pair of brake disks and right and left pairs of pads. Each pad includes a twisting compliant section that extends along a line inclined by an angle relative to a radial direction of the corresponding brake disk. The twisting compliant section facilitates the twisting of the pad about the compliant section. The twisting compliant sections of the right inner pad and the left inner pad are inclined in opposite directions relative to the twisting compliant sections of the right outer pad and the right inner pad. The twisting compliant sections of the right inner pad and the left inner pad are inclined in substantially the same direction with one another.

16 Claims, 6 Drawing Sheets

DISK BRAKE DEVICES

This application claims priority to Japanese patent application serial number 2003-136038, the contents of which are incorporated herein by reference.

BACKGROUND OF THE INVENTION

1. Field of the Invention

The present invention relates to disk brake devices that have a pair of pads adapted to be pressed against a brake disk, including disk brake devices that have a right pair of pads and a left pair of pads that are adapted to be respectively pressed against a vehicle's right-side wheel brake disk and a vehicle's left-side wheel brake disk.

2. Description of the Related Art

In general, a vehicle, such as an automobile, disk brake device includes a right brake disk (a disk is also known as a rotor) and a left brake disk respectively connected to a right wheel and a left wheel. The disk brake device can have a right pair of pads and a left pair of pads that are adapted to be pressed against the right brake disk and the left brake disk. Each pair of right and left pads includes an inner pad and an outer pad. For example, the right pair of pads has an inner pad disposed on the left side of the brake disk and an outer pad disposed on the right side of the brake disk. The left pair of pads is configured oppositely to the right pair of pads.

Heretofore, various countermeasures have been proposed in the known art in order to reduce the squealing sounds produced by the pads of a disk brake device. For example, Japanese Laid-Open Utility Model Publication No. 6-69459 teaches a pad configured to reduce such squealing sounds. The pad of this publication includes a friction member and a back plate that supports the friction member from the back side. A recess is formed in the back plate and extends in a vertical direction (the radial direction of the brake disk). The recess enables the back plate to have a tendency to be easily bent about the recess. Therefore, during the braking operation, the pad may be bent in order to facilitate the pressing of the central portion of the pad upon the brake disk. For this reason, the central portion of the pad may still be pressed against the brake disk even if the central portion of the pad has become slightly concave due to uneven wearing of the pad. Therefore, the friction member may apply relatively uniform surface pressure, reducing the squealing sounds produced by the pad.

However, squealing sounds of a pad may be produced due to various modes of vibration, as shown in FIGS. 4 to 6. FIG. 4 shows a typical first vibration mode. The first vibration mode can manifest in vibration about a single primary bending direction. For example, the primary bending direction shown in FIG. 4 is a bending of the pad about an area across the width of the pad. FIG. 5 shows a second vibration mode. The second vibration mode can manifest in vibration about a single primary twisting direction. Generally, the second vibration mode shown in FIG. 5 is a twisting about an area obliquely extending along the length of the pad. FIG. 6 shows a third vibration mode. The third vibration mode can manifest in vibration about secondary bending locations. As shown in FIG. 6, the secondary bending locations include two bending areas extending across the width of the pad. The third vibration mode involves vibration about each of the two bending areas.

It has been known that the first, second, and third vibration modes produce separate and distinct squealing sounds. The three squealing sounds, P1, P2, and P3, can each have different frequencies, as shown in FIG. 7.

The known pad of the above publication can effectively reduce the squealing sound produced by the first vibration mode, where the vibration occurs about a single primary bending direction. However, use of the known pad does not appear to effectively reduce the squealing sounds that may be produced in the second vibration mode, where the vibration occurs about a primary twisting direction.

In another type of known pad, a recess (slit) is formed in the face of the friction member. In particular, pads are known that have such a recess (or slit) extending along the face of the friction member. However, such a recess has generally been incorporated in order to remove powders that may be produce due to wear of the friction member. Therefore, the direction or orientation of the recess with regard to reducing vibration has typically not been considered as a design factor.

SUMMARY OF THE INVENTION

It is accordingly an object of the present invention to teach improved disk brake devices that can effectively reduce the squealing sounds in a second vibration mode, where the vibration occurs about a primary twisting direction.

According to one aspect of the present teachings, disk brake devices are taught that include right and left brake disks, and right and left pairs of pads. The brake disks are adapted to be disposed connect to the right side and left side vehicle wheels. The right pair of pads and the left pair of pads applies braking forces against the respective right and left brake disks. The right pair of pads includes a right inner pad and a right outer pad respectively disposed inside (to the left) and the outside (to the right) of the brake disk of the right side vehicle wheel. The left pair of pads includes a left inner pad and a left outer pad respectively disposed inside (to the right) and the outside (to the left) of the brake disk of the left side vehicle wheel. Each of the pads includes a twisting compliant section that extends along a line inclined by an angle relative to a radial direction of the corresponding brake disk. The twisting compliant section facilitates the twisting of the pad about the twisting compliant section. As configured in the brake device, the twisting compliant sections of the right inner pad and the left inner pad are inclined in opposite directions to the twisting compliant sections of the right outer pad and the left outer pad, respectively. The twisting compliant sections of the right inner pad and the left inner pad are inclined in substantially the same direction as one another. The twisting compliant sections of the right outer pad and the left outer pad are inclined in substantially the same direction as one another.

Therefore, during the braking operation, each of the pads may have a tendency to bend about the twisting compliant section. Because the twisting compliant sections of the right inner pad and the left inner pad are both respectively inclined in opposite directions to the twisting compliant sections of the right outer pad and the left outer pad, the production of coupled vibrations between the inner pads and the respective outer pads can be reduced or minimized. As a result, squealing sounds produced due to the vibrations in a primary twisting direction can be effectively reduced or minimized.

In addition, because the twisting compliant sections of the right inner pad and the left inner pad are inclined in substantially the same direction with each other, the twisting compliant sections of the right pair of pads and the twisting compliant sections of the left pair of pads may be arranged symmetrically with one another. The arrangement is similar to a mirror reflection of the right to left side with a mirror running down the longitudinal centerline of the vehicle. The inner right and left pads are inclined at substantially the same angle and the outer right and left pads are inclined at substantially the same angle.

The squealing sounds may be produced due to various factors. One factor is the property of the brake disks, such as the natural frequency vibration of the brake disks. In general, the properties of the right and left brake disks also exist symmetrically with each other.

Because the twisting compliant sections of the right pair of pads and the twisting compliant sections of the left pair of pads may be arranged symmetrically with one another, the squealing sounds may be effectively reduced or minimized. Thus, the squealing sounds at the left side brake disk may be reduced or minimized simultaneously as the squealing sounds at the right side brake disk are reduced or minimized. In this way, the symmetrical orientation of the pads uses the symmetrical properties of the brake disks to help control the squealing sounds.

The twisting compliant section of each pad may extend through substantially the center of the pad, when viewed in a direction parallel to the rotational axis of the corresponding brake disk (e.g., perpendicular to the friction or backing surface of the pad).

The twisting compliant sections of the right inner pad and the left inner pad may be configured to be substantially symmetrical with the twisting compliant sections of the right outer pad and the left outer pad, with respect to centers of the respective pads as viewed in a direction parallel to the rotational axis of the respective brake disks.

In another aspect of the present teachings, each of the pads includes a friction member that is adapted be pressed against the corresponding brake disk. The twisting compliant section is provided on the friction member.

Preferably, the twisting compliant section is configured by a simple construction, such as a recess (i.e., groove, slit, etc.), formed in a surface of the friction member. Therefore, the overall thickness of the pad may be reduced across the twisting compliant section, so that the pad may have an increased tendency to twist at the twisting compliant section. In addition, such a twisting compliant section can be readily provided with a simple manufacturing process.

Alternatively, the twisting compliant section may be made of material that is more flexible than the material of the other part of the friction member. The material may be a different type of material or a more flexible variation of the same material or the same type of material.

In another aspect of the present teachings, each of the pads comprises a friction member adapted to be pressed against the corresponding disk and a back plate that serves to support the friction member from the back side of the friction member. The twisting compliant section is provided on the back plate.

Using the back plate for the twisting compliant section allows for the greatest contact area of the friction member against the corresponding brake disk. The friction member does not have to be reduced due to the incorporation of the twisting compliant section. Therefore, the applicable braking force applied to the brake disk may be relatively unchanged.

Preferably, the twisting compliant section is configured as a recess formed in the back plate. This configuration for the twisting compliant section results in a relatively simple construction and may be easily provided in the back plate.

Alternatively, the twisting compliant section may be made of material that is more flexible than the material of the other part (or remaining part) of the back plate. Treating or further processing of the material in the twisting compliant section, such as heating, etc, may also result in a more compliant section.

In another aspect of the present teachings, the twisting compliant section has a first end terminating at a radially outer edge of each pad. The second end terminates at a radially inner edge of each pad.

In still another aspect of the present teachings, the inclination angle of the twisting compliant section of each pad is within the range of 35° to 55° from a line extending in the radial direction of the rotational axis of the brake disk.

In another aspect of the present teachings, the twisting compliant sections of the right inner pad and the left inner pad are inclined radially outwardly in the normal or primary rotational direction of the brake disks (usually associated with forward motion of the vehicle). The twisting compliant sections of the right outer pad and the left outer pad are inclined radially inwardly in the predominant rotational direction of the brake disks.

In another aspect of the present teachings, methods of determining positions or locations for the placement of twisting compliant sections of disk brake devices are taught. The methods may include the following steps:

(1) Preparing right and left pairs of pads that do not include twisting compliant sections.

(2) Selecting the one of the pads that may have the highest tendency to produce vibrations and determining the primary twisting direction of the selected pad. For example, the highest tendency may be determined based upon the various magnitudes of the measured vibrations.

(3) Determining a central line about which the selected pad may be twisted in the primary twisting direction.

(4) Determining the position of the twisting compliant section of the selected pad such that the twisting compliant section extends along a line that intersects the central line.

(5) Determining the positions of the twisting compliant sections of the other pads based upon the position of the twisting compliant section of the selected pad.

Thus, according to these methods, the position of the twisting compliant section of the selected one of the pads having the highest tendency to produce vibrations is first determined based upon the primary twisting direction that may be obtained by experiments or simulations. In particular, the position of the twisting compliant section of the selected one of the pads is determined to extend along a line that intersects the central line of the primary twisting direction. Therefore, the selected one of the pad may be reliably prevented from being twisted about the central line of the primary twisting direction. In other words, the squealing sounds that may be produced due to vibrations in the primary twisting direction of the selected pad can be minimized or reduced.

Then, the positions of the twisting compliant sections of the other pads are determined based upon the position of the twisting compliant section of the selected one of the pads and the relationship described in connection with the above aspects of the disk brake devices. The positions of the twisting compliant sections of the other pads can therefore be easily determined to effectively reduce the squealing sounds

DETAILED DESCRIPTION OF THE INVENTION

Each of the additional features and teachings disclosed above and below may be utilized separately or in conjunction with other features and teachings to provide improved disk brake devices and methods of determining twisting compliant sections of such improved disk brake devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

FIRST REPRESENTATIVE EMBODIMENT

Figure 1:
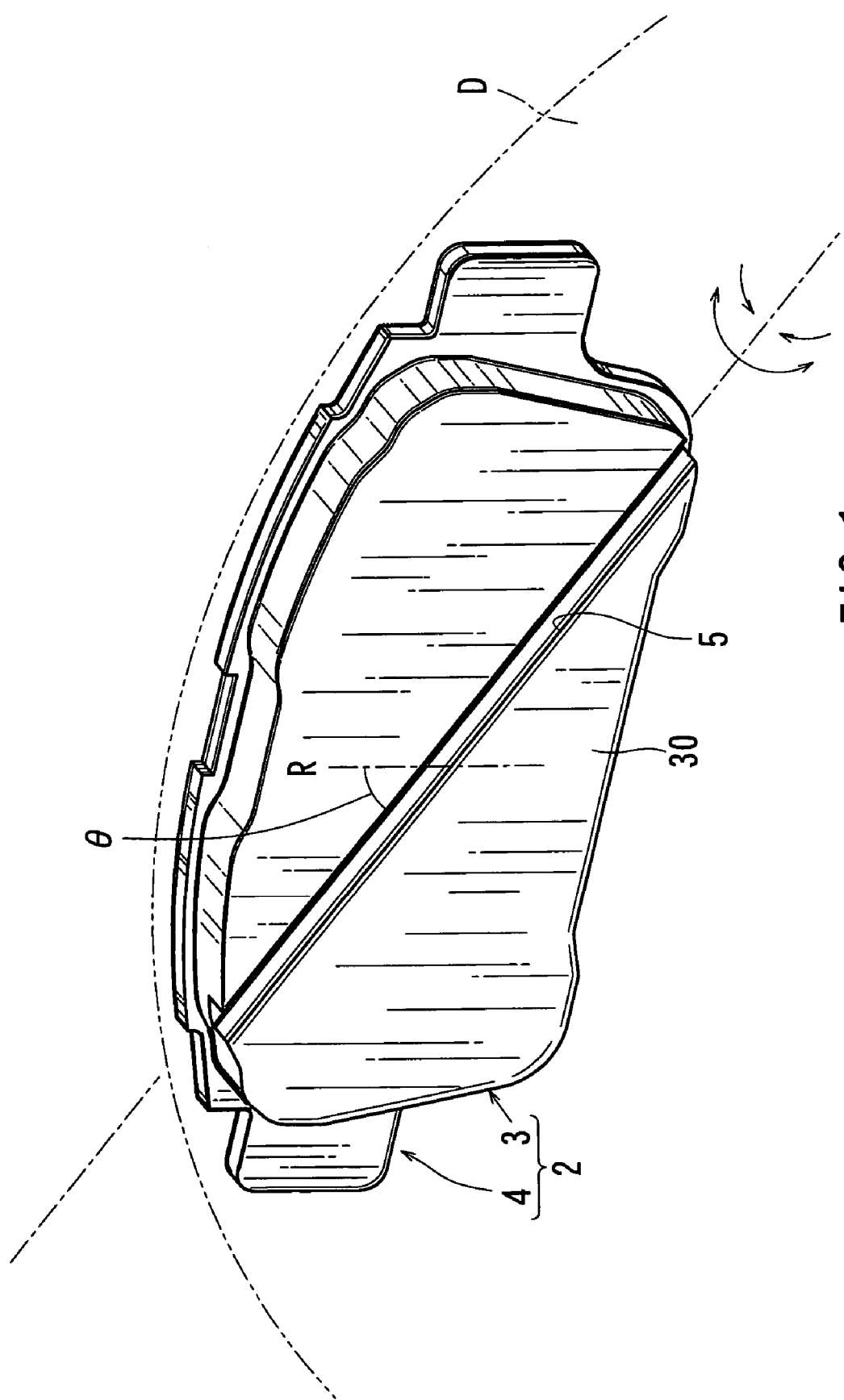
FIG. 1 is a front perspective view of one of the pads of a representative brake device.
Figure 2:
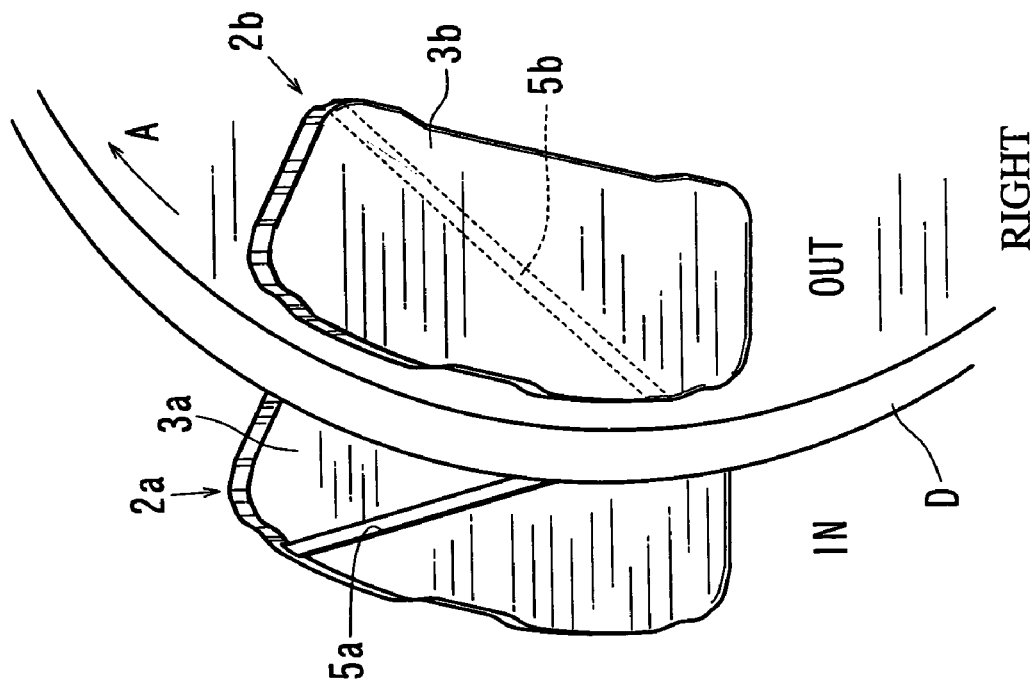
FIG. 2 is a schematic perspective view of an entire representative brake device.
Figure 2:
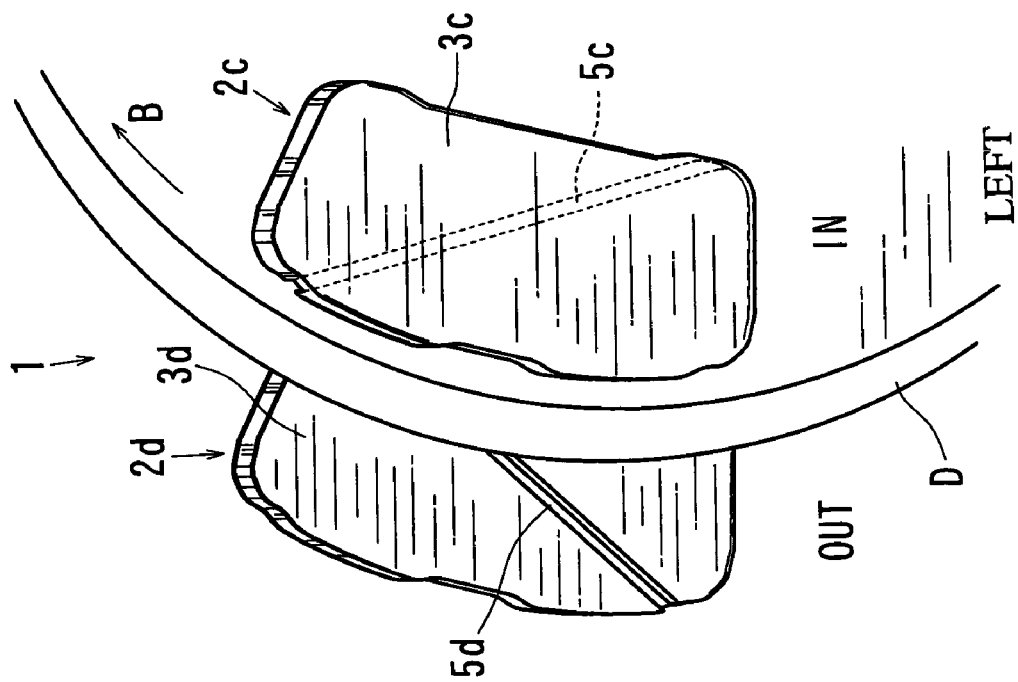

A first representative embodiment will now be described with reference to FIGS. 1 to 8. As shown in FIGS. 1 and 2, a representative disk brake device 1 includes four pads 2, and right-side and left-side brake disks (rotors) D. The right-side and left-side brake disks D are adapted to be respectively connected or interfaced with a right-side wheel and a left-side wheel of an automobile (not shown), so as to controllably restrict the rotation of the right-side wheel and the left-side wheel. The right-side pairs of pads 2 are adapted to be pressed against the right-side brake disk D and will be hereinafter referenced as pads 2a and 2b. Similarly, the left-side pair of pads 2 are adapted to be pressed against the left-side brake disk D and will be hereinafter referenced as pads 2c and 2d.

Although not shown in the drawings, the disk brake device 1 further includes a first mount and a second mount. The first mount is attached to an automobile body on the side of the right-side wheel in order to support the pads 2a and 2b. The first mount is adapted to allow pads 2a and 2b to move in directions parallel to the rotational axis of the right-side disk D. The second mount is attached to an automobile body on the side of the left-side wheel in order to support the pads 2c and 2d. The second mount is adapted to allow pads 2c and 2d to move in directions parallel to the rotational axis of the left-side disk D.

Although also not shown in the drawings, the disk brake device 1 further includes a pressing device for pressing the pads 2a and 2b against the right-side disk D. Disk brake device 1 also includes a pressing device for pressing the pads 2c and 2d against the left-side disk D. Each pressing device has a caliper that is supported by one of the first and second mounts such that the caliper can move in directions parallel to the rotational axis of the right or left-side disk D. Each caliper has a piston adapted to press the pads 2a and 2c (disposed to the inner side with respect to the disks D) against the corresponding right and left disks D. Each caliper also has claws adapted to press the pads 2b and 2d (disposed to the outer side with respect to the disks D) against the corresponding right and left disks D.

As shown in FIG. 1, each of the pads 2 has a friction member 3 and a back plate 4. The back plate 4 is typically made of metal and serves to support the friction member 3 from the back side. The friction member 3 has a substantially flat, plate-like configuration, and has a pressing surface 30 located on the front side. The pressing surface 30 is adapted to be pressed against the surface of the disk D, so that the pressing surface 30 frictionally slides upon the surface of the disk D in order to apply a braking force. For the purposes of explanation, the friction members 3 of the pads 2a, 2b, 2c, and 2d, are respectively referenced as friction members 3a, 3b, 3c, and 3d.

As shown in FIG. 1, the friction member 3 has a twisting compliant section 5 that facilitates the twisting of the friction member 3 about the twisting compliant section 5. In this representative embodiment, the twisting compliant section 5 is configured as a recess formed in the pressing surface 30. The recess extends obliquely relative to the radial direction R by an angle θ. More specifically, the twisting compliant section 5 extends between the outer edge (the top edge as seen in FIG. 1, farthest away from the rotational axis of the disk D) and the inner edge (the bottom edge seen in FIG. 1, closest to the rotational axis of the disk D) of the pressing surface 30. In addition, the twisting compliant section 5 extends in the circumferential direction of the disk D across the pressing surface 30 (left edge to right edge as seen in FIG. 1). In other words, the twisting compliant section 5 extends obliquely relative to the radial direction R and also obliquely relative to the circumferential direction of the disk D.

Figure 3:
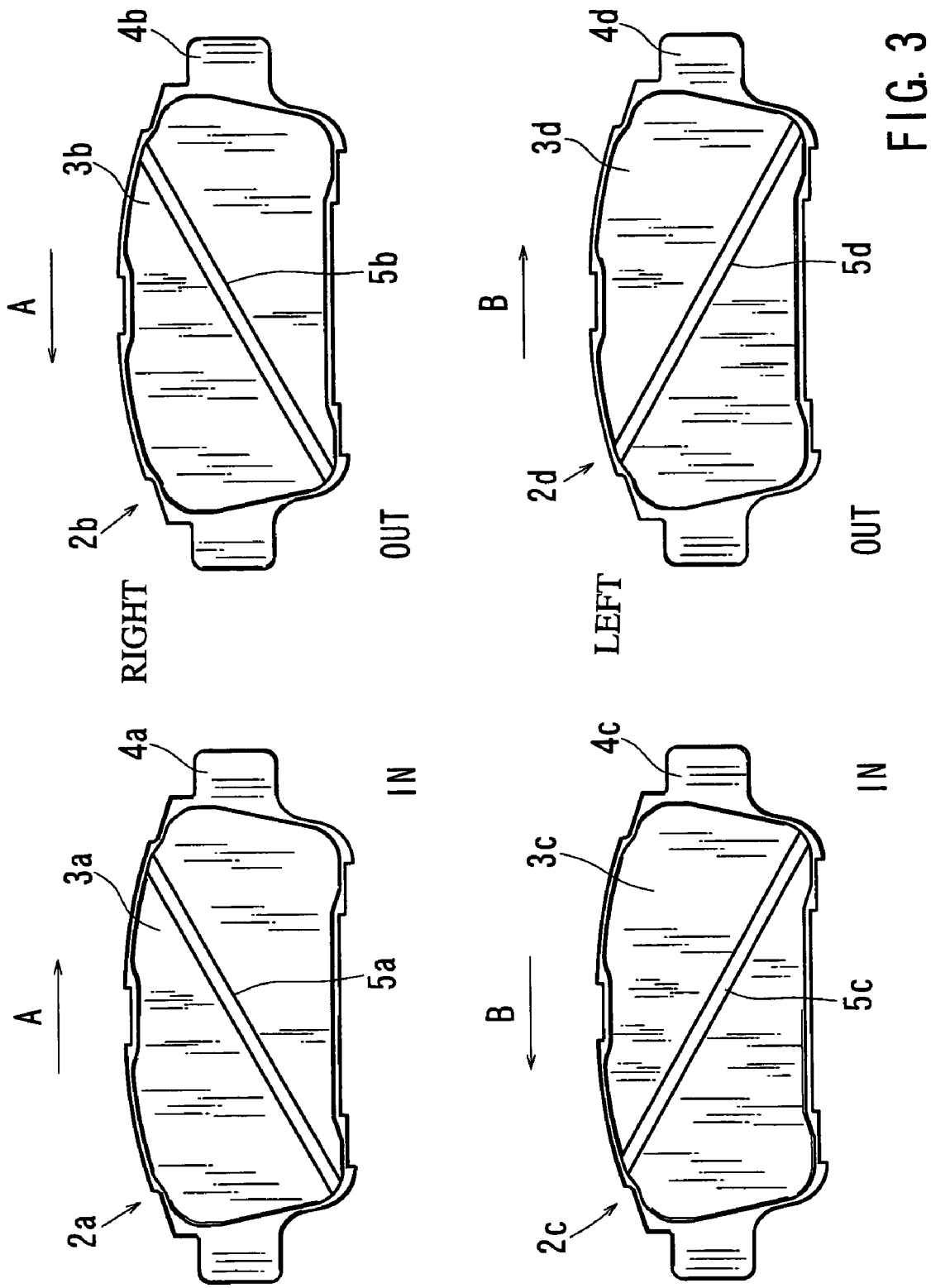
FIG. 3 is a view showing the front of two pairs of pads.
Figure 5:
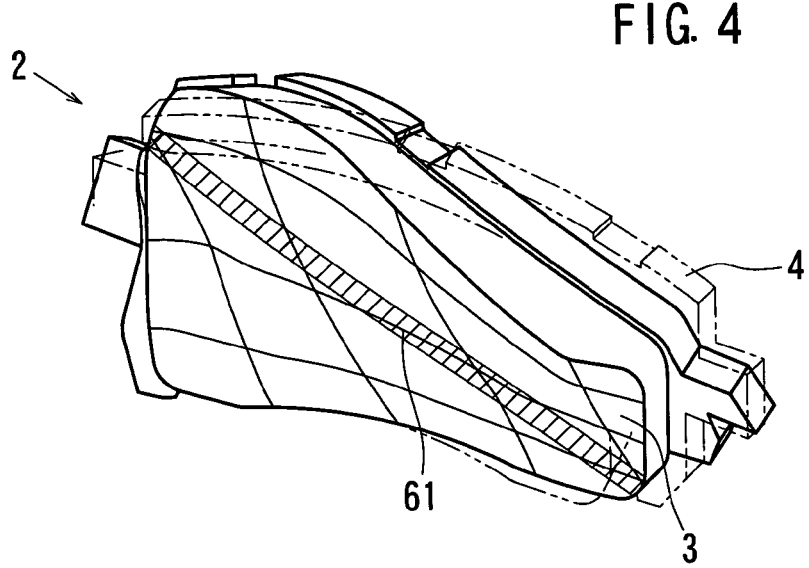
FIG. 5 is a front perspective view similar to FIG. 4 but illustrating vibration about a primary twisting direction and a second vibration mode.

In order to effectively reduce squealing sounds, the angle θ may be determined such that the twisting compliant section 5 extends to intersect the direction of a central line 61 (twisting center as shown in FIG. 5) about which the pad 2 may be possibly twisted during the braking operation if no twisting compliant section 5 were provided. Otherwise, the angle θ may be determined such that the twisting compliant section 5 extends along a line that is symmetrical with the central line 61 with respect to the center of the pressing surface 30 (including perpendicular to the central line 61). For the purposes of explanation, the twisting compliant sections 5 of the pads 2a, 2b, 2c, and 2d, are respectively referenced as twisting compliant sections 5a, 5b, 5c, and 5d. In the representative embodiment, the twisting compliant sections 5a and 5b of the pads 2a and 2b may extend upward when moving to the right and viewed from the side of the pressing surfaces 30 (as shown in FIG. 3). The twisting compliant sections 5c and 5d of the pads 2c and 2d may extend downward when moving to the right and viewed from the side of the pressing surfaces 30 (also shown in FIG. 3). Therefore, in the representative embodiment, the pads 2a through 2d may generally comprise two different types of pads.

Preferably, the angle θ is determined within the range of 35° to 55°. The results of our experiments have shown that this range may effectively inhibit breakage of the friction member 3 and reduce squealing sounds produced by the pads.

The pads 2a through 2d are positioned relative to the disks D as shown in FIG. 2. Sections 5a and 5c of the pads 2a and 2c positioned inside (indicated by "IN") of the disks D (to the inside of the vehicle body). Sections 5a and 5c are inclined in opposite directions relative to the twisting compliant sections 5b and 5d of the pads 2b and 2d. Sections 5b and 5d are positioned outside (indicated by "OUT") of the disks D (to the outside of the vehicle body). In addition, the twisting compliant sections 5a and 5c of the inner pads 2a and 2c extend parallel to one another (i.e., inclined in the same direction). As a result, sections 5b and 5d of the outer pads 2b and 2d also extend parallel to one another (i.e., inclined in the same direction).

Figure 4:
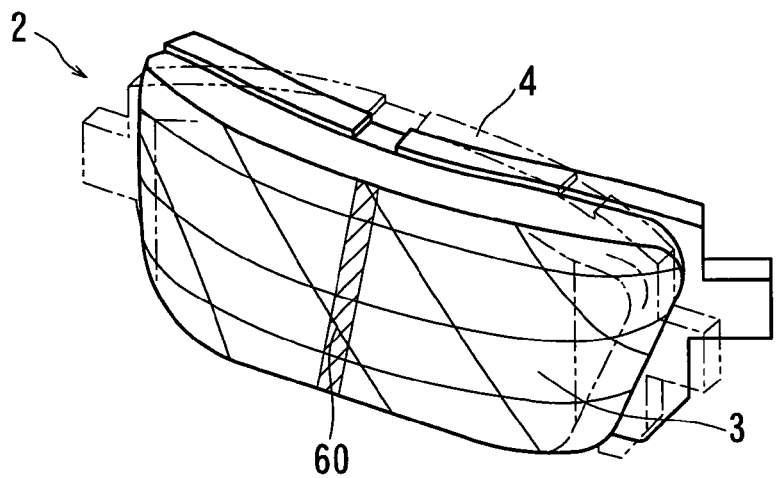
FIG. 4 is a front perspective view of one of the pads illustrating vibration about a primary bending direction and a first vibration mode.
Figure 6:
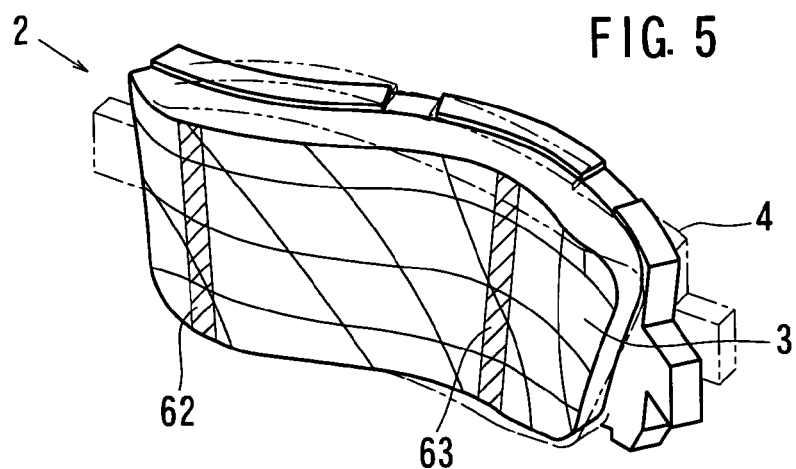
FIG. 6 is a front perspective view similar to FIG. 4 but illustrating vibration about a secondary bending direction and a third vibration mode.

As explained previously, the squealing sounds of a pad may be produced due to various modes of vibration of the pad as shown in FIGS. 4 to 6.

In the case of pad 2 of the representative embodiment, pad 2 may vibrate about a generally vertical line 60 (regions indicated with hatching) in the first vibration mode, as shown in FIG. 4. Pad 2 may vibrate about the central line 61 (inclined relative to the radial direction of the disk D) in the second vibration mode, as shown in FIG. 5. FIG. 6 shows that pad 2 may also vibrate about two separate, generally vertical lines, 62 and 63, in the third vibration mode.

Figure 7:
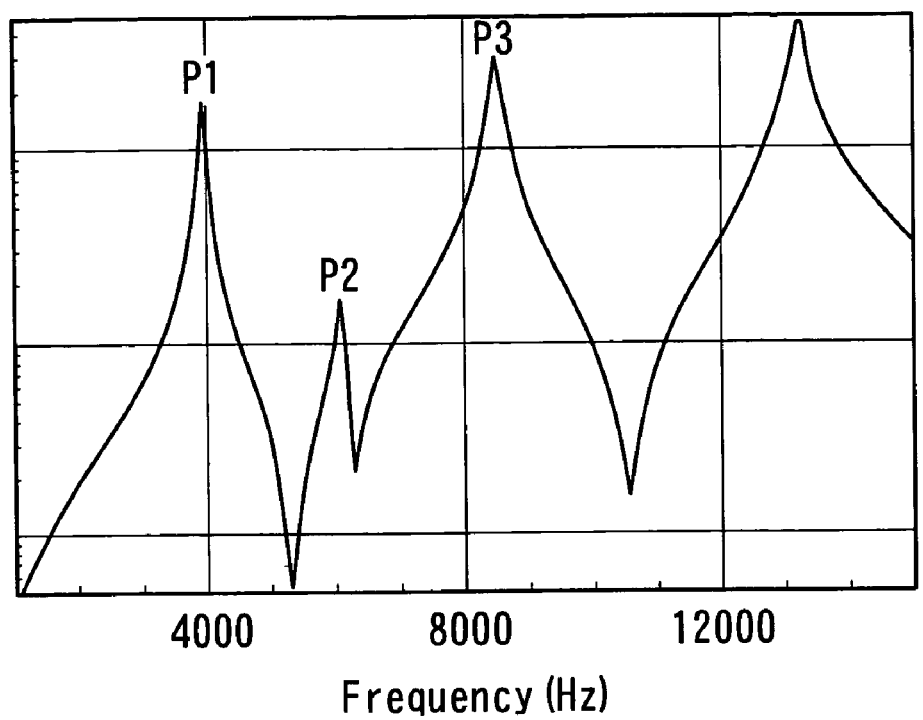
FIG. 7 is a graph showing a relationship between the frequencies of the squealing sounds produced in various vibration modes.

The first, second, and third vibration modes may produce distinct squealing sounds P1, P2, and P3. The three sounds may have different frequencies as shown in FIG. 7. For example, the squealing sounds P1, P2, and P3, respectively may have frequencies of approximately, 4,000 Hz, 6,000 Hz, and 8,000 Hz.

In the representative embodiment, the angle θ may be determined in the following way:

First, pads that correspond to the pads 2a through 2d, but do not include the twisting compliant sections 5, are prepared or assumed. Then, through experiments or simulations, one of the pads having the highest tendency to produce vibrations (in the primary twisting direction) is selected. For example, the highest tendency may be determined based on the magnitude of vibrations or the number of times the vibrations exceed a predetermined sound threshold. During the simulations, the properties of the disks D and the positions for restricting the movement of the pads may be chosen as parameters. More specifically, the configurations of the disks D may be chosen as parameters relating to the properties of the disks. The positions of the pads where the pistons or claws of the caliper apply a pressing force against the pads, or the positions of the pads where the pads are supported by the mounts, may be chosen as parameters relating to the positions for restricting the movement of the pads.

Through experiments or simulations, the direction to which the selected pad is most likely to twist is determined. Thus, the second vibration mode is realized in the experiments or is assumed in the simulations in order to determine the primary twisting direction of the second vibration mode. Based upon the obtained primary twisting direction, the central line 61 (twisting center) for the pads 2 is determined.

Thereafter, the twisting compliant section 5 for the selected pad is determined so as to extend across and intersect the central line 61. For example, the twisting compliant section 5 may be symmetrical with respect to the center of the surface 30 (see FIG. 1) or may extend substantially perpendicular to the central line 61.

After the determination of the twisting compliant section 5 of the selected pad, the twisting compliant section 5 of the other pads are determined as described previously. Thus, the twisting compliant section 5 of the inner pad 2a (2c) and the twisting compliant section 5 of the outer pad 2b (2d) are determined so as to be inclined in opposite directions from one another. In addition, the twisting compliant section 5a of the right-side inner pad 2a and the twisting compliant section 5c of the left-side inner pad 2c are determined so as to be inclined in the same direction (when viewed in an installed state). On the other hand, the twisting compliant section 5b of the right side outer pad 2b and the twisting compliant section 5d of the left-side outer pad 2d are determined so as to also be inclined in the same direction. In this way, the inclination direction of all of the pads 2 can be determined such that their twisting compliant sections 5 extend across their respective central lines of primary twisting directions.

Figure 8:
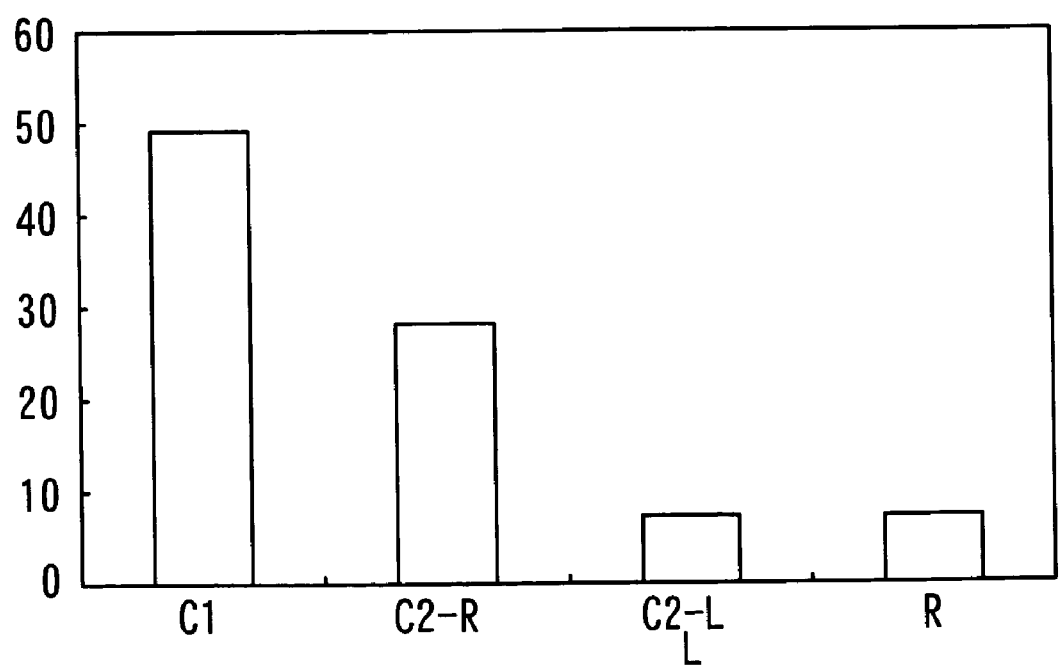
FIG. 8 is a graph showing the occurrence of the production of the squealing sounds produced by a representative brake device in comparison with the occurrence of the production of the squealing sounds produced by the known disk brake device.

Further experiments have been conducted in order to evaluate the generation of squealing sounds during the breaking operation of the representative disk brake 1. The results of the experiments are shown in FIG. 8. The ordinate axis represents the number of times that the production of squealing sounds exceeded a predetermined acoustic level during a predetermined number of braking operations. L and R respectively indicate the values for the left side pads 2 and the right side pads 2. C1 indicates the number of times the sounds were generated for the pads of the known disk brake having no twisting compliant sections corresponding to the representative embodiment. C2-R and C2-L indicate the numbers for the pads when the pads corresponding to pads 2c and 2d, each having twisting compliant sections 5 inclined upward in the left direction (as viewed from the side of the pressing surface 30) are also used as pads 2a and 2b. More specifically, C2-R indicates the amount of sound generation for the right side pads and C2-L indicates the amount of sound generation for the left side pads.

As can be seen in FIG. 8, the occurrence of squealing sounds of pad configuration C1 is greater than any of the other pad configurations, L, R, C2-R, and C2-L. This indicates that the twisting compliant sections 5 are effective in reducing the overall generation of squealing sounds. Although the frequency of occurrence for C2-R is greater than the frequency of occurrence of C2-L, the quantities for configuration R and configuration L are substantially equal to each other. This indicates that the symmetrical arrangement of the twisting compliant sections 5, between the twisting compliant sections 5 on the right-side pads 2 and the twisting compliant sections 5 on the left-side pads 2, is effective in reducing the generation of squealing sounds for both right-side pads 2 and left-side pads 2. When all four pads, as viewed from the side of the pressing surface 30, have the same orientation of twisting compliant sections 5 (for example, upwards to the left direction, similar to pads 2c and 2d in FIG. 3), one side of the vehicle will generate more squealing sounds than the other side. This is indicated in the case where C2-R produces more squealing sounds than C2-L.

As described above, according to the representative disk brake device 1, the twisting compliant section 5 of each pad 2 extends obliquely, relative to the circumferential direction or the radial direction of the disk D. In addition, the twisting compliant section 5 of the inner pads 2a and 2c are inclined in the opposite direction relative to the inclined direction of the outer pads 2b and 2d, as shown in FIG. 2.

Therefore, the pads 2 are adapted to be able to twist about their respective twisting compliant sections 5. The production of coupled vibrations, between the inner pads, 2a and 2c, and the respective outer pads, 2b and 2d, can be reduced or minimized because the twisting compliant sections 5 of the inner pads 2a and 2c are inclined in the opposite direction relative to the inclination of the twisting compliant sections 5 of the outer pads 2b and 2d. As a result, the production of squealing sounds due to vibrations about the primary twisting direction can be effectively reduced.

In addition, the twisting compliant section 5a of the right-side inner pad 2a and the twisting compliant section 5c of the left-side inner pad 2c extend in the same direction, substantially parallel to each other, as shown in FIG. 2. Also, the twisting compliant section 5b of the right-side outer pad 2b and the twisting compliant section 5d of the left-side outer pad 2d extend in the same direction or parallel to each other. Thus, the twisting compliant sections 5a and 5b of the right-side pads 2a and 2b, and the twisting compliant sections 5c and 5d of the left side pads 2c and 2d, are arranged symmetrically with respect to the central line (longitudinal axis) of the automobile.

It has been known that the squealing sounds may be produced due to many various factors. The property of the disks, e.g., the natural frequency vibrations of the disks, is one of the factors. In general, the properties of the right side of the disk and the properties of the left side of the disk are symmetrical to each other.

According to this representative embodiment, the twisting compliant sections 5a and 5b of the right-side pads 2a and 2b, and the twisting compliant sections 5c and 5d of the left-side pads 2c and 2d, are arranged symmetrically to each other as described above. Therefore, the squealing sounds may be effectively reduced. The squealing sounds that may be produced at the right side wheel can be effectively reduced, while the squealing sounds that may be produced at the left side wheel can also be effectively reduced.

For at least the above reasons, the representative disk brake device 1 can reduce the squealing sounds that may be produced due to vibrations in the primary twisting direction.

Further, according to the representative embodiment, the twisting compliant sections 5 are configured as recesses formed in the surfaces of the friction members 3. In other words, the thickness of the pads 2 are reduced along the twisting compliant sections 5, allowing the pads 2 to be readily twisted about the twisting compliant sections 5. In addition, configuring the twisting compliant sections 5 as recesses allows for a relatively simple construction and can be easily provided.

Experiments and/or simulations may determine the inclination angle of the twisting compliant sections 5. The pad producing the greatest vibration is first selected. Then, the primary twisting line 61 (see FIG. 5) of the selected pad is determined. The twisting compliant section 5 is set so as to intersect the primary twisting direction. After the twisting compliant section 5 of the selected pad has been determined, the remaining twisting compliant sections 5 of the other pads may be determined based upon the twisting compliant section 5 of the selected pad. As a result, the twisting compliant sections 5 can be readily determined to effectively reduce the vibrations in the respective primary twisting directions of the pads 2.

SECOND REPRESENTATIVE EMBODIMENT

Figure 9:
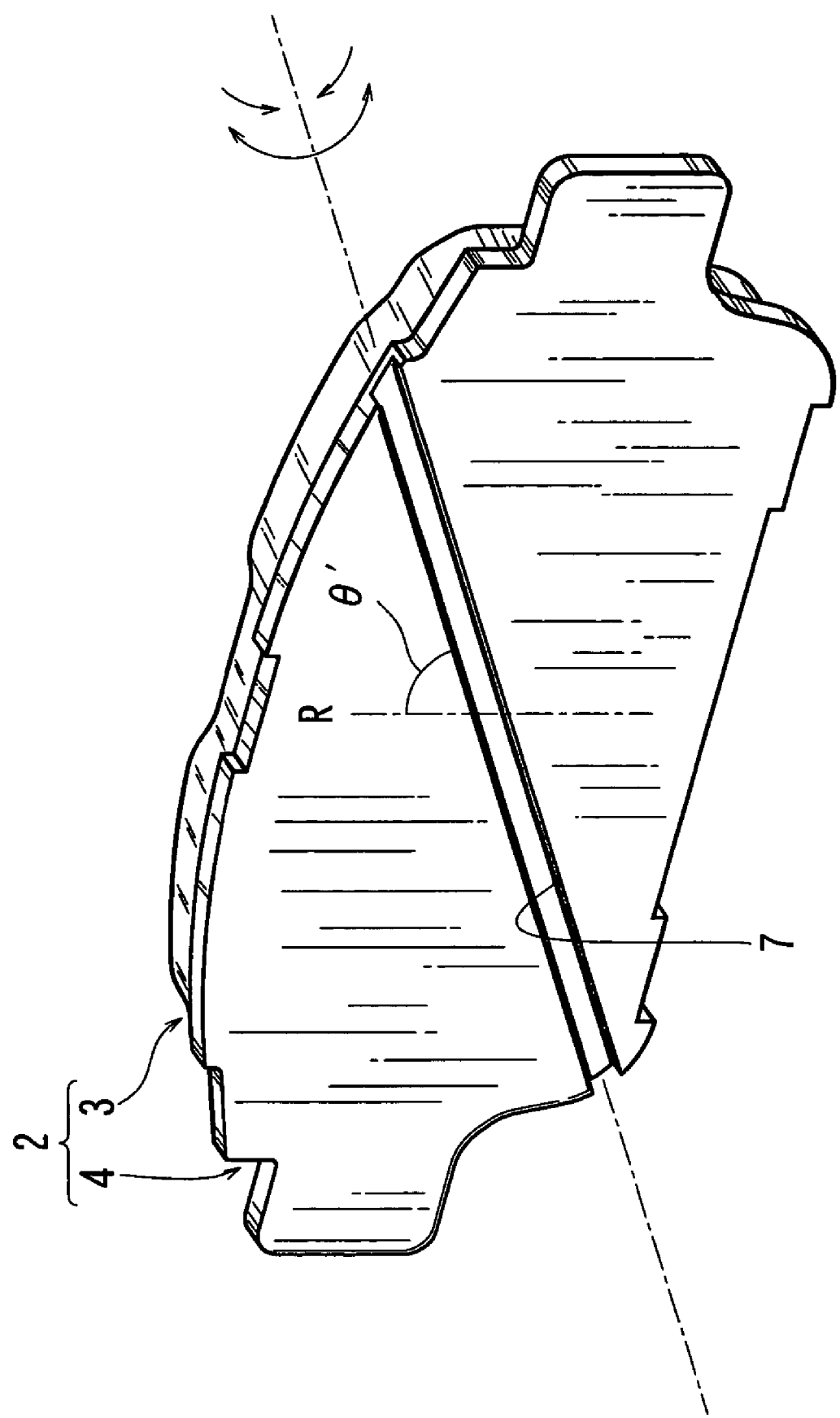
FIG. 9 is a rear perspective view of a second embodiment of one of the pads of a representative brake device.

A second representative embodiment will now be described with reference to FIG. 9. The second representative embodiment is essentially the same as the first representative embodiment with an exception of the location of the twisting compliant section. Instead of a twisting compliant section 5 located in the friction member 3, the second representative embodiment has a twisting compliant section 7 formed in the back plate 4. Only one pad 2 is shown in FIG. 9, and this pad corresponds to the pad 2 shown in FIG. 1 of the previous embodiment. Because the pad 2 of the second representative embodiment does not have the twisting compliant section formed in the pressing surface of friction member 3, the pressing surface 30 of the second representative embodiment has a relatively broader pressing surface area than the pressing surface area of the friction member 3 of the first representative embodiment.

Similar to the twisting compliant section 5 of the first representative embodiment, the twisting compliant section 7 is configured as a recess formed in the back plate 4. In addition the twisting compliant section 7 is inclined relative to the radial direction of the disk D by an angle θ'. The angle θ' extends obliquely between the outer radial edge (top edge as seen in FIG.9) and the inner radial edge (bottom edge as seen in FIG. 9) of the surface of the back plate 4. In order to effectively reduce the squealing sounds, the angle θ' may be determined such that the twisting compliant section 7 extends in a direction opposite to the direction of the central line 61 (twisting center). As in the previous embodiment, the central line 61 is the twisting center about which the pad 2 may possibly twist, as shown in FIG. 5, during braking operations when no twisting compliant sections are provided. Otherwise, the angle θ' may be determined such that the twisting compliant section 7 extends along a line that is symmetrical to the central line 61, with respect to the center of the pressing surface 30, or is perpendicular to the central line 61. Preferably, the angle θ' is determined to be within the range of 35° to 55° from the radially outward direction.

The operation and effects of the second representative embodiment are substantially the same as for the first representative embodiment. In particular, because the twisting compliant section 7 is configured as a recess formed in the back plate 4, the overall thickness of the pad 2 is reduced along the twisting compliant section 7, allowing the pad 2 to be easily twisted about the twisting compliant section 7. In addition, the twisting compliant section 7, configured as a recess, is a relatively simple construction and can be easily provided. Because the twisting compliant section 7 is formed in the back plate 4, the surface area of the pressing surface 30 of the friction member 3 is not reduced in order to provide the twisting compliant section 7. Therefore, the braking force applied to the disk D may not be reduced by the provision of a twisting compliant section 7.

OTHER POSSIBLE EMBODIMENTS

The present invention may not be limited to the above representative embodiments but may be modified in various ways:

(1) Although the twisting compliant sections 5 and 7 are configured as recesses in the representative embodiments, they may be replaced with parts that are more flexible than the other parts of the friction member 3 or the back plate 4.

(2) Although the friction member 3 is configured as a single flat plate in the first representative embodiment, the friction member 3 may be divided into two parts and the twisting compliant section configured as a slit or a space formed between the two parts.

(3) Although the back plate 4 is configured as a single flat plate in the first representative embodiment, the back plate 4 may be divided into two parts and the twisting compliant section configured as a slit or a space formed between two parts.

(4) Although disk brake device is described in terms of a left and a right set of disks and pads, the invention may be used with a single brake disk and a pair of pads, i.e., for a motorcycle application. In this type of embodiment, the pad directly contacting the claws of the caliper (typically the outer pad), has a twisting compliant section which is angled from an outer radial location to an inner radial location as the disk rotates in the predominant direction of rotation (i.e., the forward direction for automobiles, motorcycles, etc.). The pad directly contacting the piston of the caliper (typically the inner pad) has a twisting compliant section which is angled from an inner radial location to an outer radial location as the disk rotates in the predominant direction (see either left or right side of FIG. 2). The single brake disk and pair of pads described in this manner can also be used in non-vehicle applications, such as for a drive shaft emergency brake for example.

(5) Although a single twisting compliant section is shown in either the friction side or the back plate side of a pad, more than one twisting compliant section may be used. For example, a more shallow recess can be used in both the back plate side of the pad and the friction side of the pad. Other combinations are also available. For example, a composite material back plate incorporating a twisting compliant section in the plate and a recess in the friction side of the pad can be used, as well as other combinations obvious to a person skilled in the art.

(6) Although the twisting compliant section is shown as extending across the entire pad in an unbroken recess in the representative embodiment, any geometry that allows for an increased ability of the pad to twist about the compliant section can be used. For example, intermittent recesses or sections only extending over a portion of the pad, etc. can be twisting compliant sections.

This invention claims:

1. A disk brake device comprising:
at least a pair of brake disks arranged and constructed to be disposed so as to interface with a right side vehicle wheel and a left side vehicle wheel, where each brake disk further includes;
a rotational axis, and
a inner brake disk surface, and
an outer brake disk surface,
a right pair of pads and a left pair of pads arranged and constructed to apply braking forces against respective brake disks;
the right pair of pads includes a right inner pad and a right outer pad respectively disposed in sliding contact with the inside brake disk surface and the outside brake disk surface of the brake disk of the right side vehicle wheel;
the left pair of pads includes a left inner pad and a left outer pad respectively disposed in sliding contact with the inside brake disk surface and the outside brake disk surface of the brake disk of the left side vehicle wheel;
each of the pads includes:
a twisting compliant section that extends along a line inclined relative to a radial direction of the corresponding brake disk in order to facilitate the twisting of the pad about the twisting compliant section;
a friction member arranged and constructed to be pressed against the corresponding brake disk, and
a back plate arranged and constructed to support the friction member from a back side of the friction member,
the twisting compliant section of each of the pads is provided in the corresponding back plate of each of the respective pads;
the twisting compliant sections of the right inner pad and the left inner pad are inclined in opposite directions to the twisting compliant sections of the right outer pad and the left outer pad, respectively; and
the twisting compliant sections of the right inner pad and the left inner pad are inclined in substantially the same direction with each other.

2. A disk brake device as in claim 1, wherein the twisting compliant section of each pad extends through substantially a center of the pad as viewed in a direction parallel to the rotational axis of the corresponding brake disk.

3. A disk brake device as in claim 1, wherein the twisting compliant sections of the right inner pad and the left inner pad are configured to be substantially symmetrical with the twisting compliant sections of the right outer pad and the left outer pad with respect to centers of the respective pads as viewed in a direction parallel to the rotation axis of the respective brake disks.

4. A disk brake device as in claim 1, wherein the twisting compliant section is configured as a recess formed in the back plate.

5. A disk brake device as in claim 1, wherein the twisting compliant section is made of a material that is more flexible than a material of a remaining part of the back plate.

6. A disk brake device as in claim 1, wherein the twisting compliant section has a first end terminating at a radially outer edge of each of the pads and a second end terminating at a radially inner edge of each of the pads.

7. A disk brake device as in claim 1, wherein the twisting compliant section of each of the pads is inclined relative to a radial direction of the corresponding brake disk by an angle within a range of 35° to 55°.

8. A disk brake device as in claim 1,
wherein the twisting compliant sections of the right inner pad and the left inner pad are inclined from a radial centerline of the back plate in the intended primary rotational direction of the brake disks, and
wherein the twisting compliant sections of the right outer pad and the left outer pad are inclined from a radial centerline of the back plate in the intended primary rotational direction of the brake disks.

9. A method of determining a position of twisting compliant sections of the disk brake device as in claim 1, comprising:
preparing right and left pairs of pads that do not include twisting compliant sections;

selecting one of the pads having a higher tendency to produce vibrations than the other pads;
determining a primary twisting direction of the selected pad;
determining a central line about which the selected pad may twist in the primary twisting direction; and
determining a position of a twisting compliant section of the selected pad such that the twisting compliant section extends along a line that intersects the central line;
determining the positions of the twisting compliant sections of the other pads based upon the position of the twisting compliant section of the selected pad.

10. A disk brake device comprising:
at least a pair of brake disks arranged and constructed to be disposed so as to interface with a right side vehicle wheel and a left side vehicle wheel, where each brake disk further includes;
a rotational axis, and
a inner brake disk surface, and
an outer brake disk surface,
a right pair of pads and a left pair of pads arranged and constructed to apply braking forces against respective brake disks;
the right pair of pads includes a right inner pad and a right outer pad respectively disposed in sliding contact with the inside brake disk surface and the outside brake disk surface of the brake disk of the right side vehicle wheel;
the left pair of pads includes a left inner pad and a left outer pad respectively disposed in sliding contact with the inside brake disk surface and the outside brake disk surface of the brake disk of the left side vehicle wheel;
each of the pads includes:
a friction member arranged and constructed to be pressed against the corresponding brake disk;
a twisting compliant section provided in each of the corresponding friction members, in which each of the twisting compliant sections extends along a line inclined relative to a radial direction of the corresponding brake disk in order to facilitate the twisting of the pad about the twisting compliant section, and in which each of the twisting compliant sections is made of a material that is more flexible than a material of a remaining part of the friction member;
the twisting compliant sections of the right inner pad and the left inner pad are respectively inclined in opposite directions to the twisting compliant sections of the right outer pad and the left outer pad; and
the twisting compliant sections of the right inner pad and the left inner pad are inclined in substantially the same direction with each other.

11. A disk brake device as in claim 10, wherein the twisting compliant section of each pad extends through substantially a center of the pad as viewed in a direction parallel to the rotational axis of the corresponding brake disk.

12. A disk brake device as in claim 10, wherein the twisting compliant sections of the right inner pad and the left inner pad are configured to be substantially symmetrical with the twisting compliant sections of the right outer pad and the left outer pad with respect to centers of the respective pads as viewed in a direction parallel to the rotation axis of the respective brake disks.

13. A disk brake device as in claim 10, wherein the twisting compliant section has a first end terminating at a radially outer edge of each of each of the pads.

14. A disk brake device as in claim 10, wherein the twisting compliant section of each of the pads is inclined relative to a radial direction of the corresponding brake disk by an angle within a range of 35° to 55°.

15. A disk brake device as in claim 10,
wherein the twisting compliant sections of the right inner pad and the left inner pad are inclined from a radial centerline of the back plate in the intended primary rotational direction of the brake disks, and
wherein the twisting compliant sections of the right outer pad and the left outer pad are inclined from a radial centerline of the back plate in the intended primary rotational direction of the brake disks.

16. A method of determining a position of twisting compliant sections of the disk brake device as in claim 10 comprising:
preparing right and left pairs of pads that do not include twisting compliant sections;
selecting one of the pads having a higher tendency to produce vibrations than the other pads;
determining a primary twisting direction of the selected pad;
determining a central line about which the selected pad may twist in the primary twisting direction; and
determining a position of a twisting compliant section of the selected pad such that the twisting compliant section extends along a line that intersects the central line,
determining the positions of the twisting compliant sections of the other pads based upon the position of the twisting compliant section of the selected pad.

* * * * *